Figure 1:
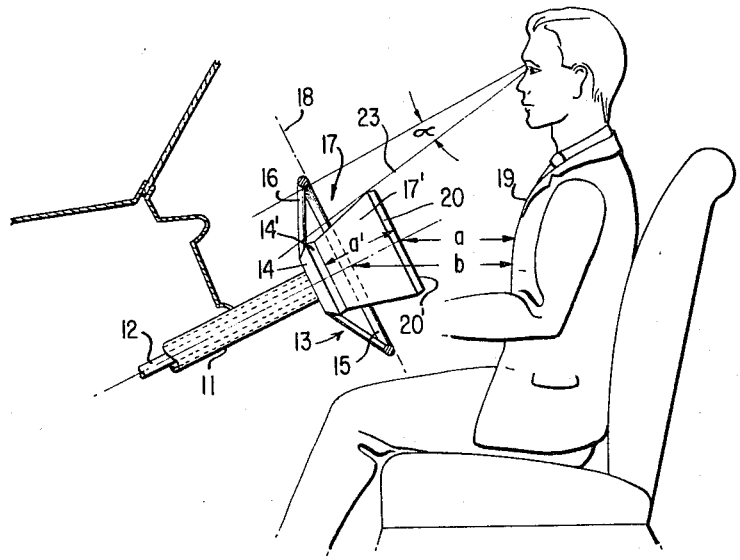

Nov. 15, 1966   E. J. H. FIALA   3,285,091
STEERING WHEEL ARRANGEMENT
Filed Jan. 9, 1963

INVENTOR.
ERNST J. H. FIALA
BY *Dicke & Craig*
ATTORNEYS.

United States Patent Office 3,285,091
Patented Nov. 15, 1966

3,285,091
STEERING WHEEL ARRANGEMENT
Ernst J. H. Fiala, Sindelfingen, Germany, assignor to Daimler-Benz Aktiengesellschaft, Stuttgart-Untertürkheim, Germany
Filed Jan. 9, 1963, Ser. No. 250,405
1 Claim. (Cl. 74—552)

The present invention relates to a steering wheel arrangement for motor vehicles provided with a central impact surface connected with the steering spindle or the steering column of which the impact plate closes a deformable hollow body capable of absorbing energy.

The present invention essentially consists in locating the impact surface above the plane of the steering wheel rim. The distance between the driver and the impact surface, designated in FIGURE 1 by $a$, is relatively small by reason of the impact surface which is directed toward the driver whereby in case of a collision, on the one hand there is achieved a shorter free acceleration of the driver and, on the other hand, the face and the body below the chest as well as those relatively little resistant ribs are not exposed to any danger by the steering wheel rim. In contradistinction thereto, with the known steering wheel arrangements having impact surfaces disposed within the plane of the steering wheel rim the aforementioned injuries are likely to occur.

By reason of the fact that according to the present invention, the size of the impact surface is determined by the line of vision from the eye of the driver to the highest point of the circumference of a hub portion supporting the impact surface, the condition of visibility remains the same notwithstanding the presence of relatively larger impact surfaces, insofar as the observation of the instruments at the instrument panel is concerned.

The present invention additionally provides that the distance between the hub portion and the impact surface is approximately the same as the distance between the impact surface and the body of the driver. It is thereby achieved in an advantageous manner that the driver, on the one hand, retains a sufficient freedom of movement and, on the other, is not exposed to any excessive free accelerations.

A further feature of the present invention consists in that the deformable hollow body capable of absorbing energy establishes the connection between the impact plate and the hub portion supporting the impact plate. The yielding hollow body capable of absorbing the energy may be constructed of cylindrical shape, of truncated conical shape and, for example, in the manner of a folded bellows. However, the hollow body may also be constituted by a spiral the material of which as relatively slight rigidity and relatively high breaking tension, that is, elongation at break.

A further feature according to the present invention is directed to the support of the spokes of the steering wheel which may be connected with the hub portion supporting the impact plate, whereby this hub portion fulfills a double function. This double function consists in fact that the hub portion serves as support for the steering wheel rim and as support for the impact plate.

However, according to the present invention the spokes of the steering wheel may also be supported on the impact plate so that the steering wheel in case of impact of the driver against the impact surface is displaced simultaneously with the deformation of the hollow body. By the use of such an arrangement no injuries caused by the steering wheel rim to the upper body and the head of the driver can occur any more.

Since furthermore according to the present invention, the spokes are so constructed that they are capable by plastic deformation to absorb energy, there is achieved an additional holding of the forwardly thrown body when the steering wheel rim finds a rigid resistance.

A further feature of the present invention resides in providing within the hollow body a guide means which consists of two guide members adapted to be displaced one within the other, of which the one guide member is rigidly connected with the impact plate and the other guide member with the steering column, the steering wheel or the hub portion. By the arrangement of such a guide means is achieved that the hollow body cannot be deformed by the steering forces since the bending moments acting on the steering wheel rim can be absorbed by the guide members.

Accordingly, it is an object of the present invention to provide a steering wheel arrangement for motor vehicles which eliminates, in an effective manner and by simple means, the shortcomings and drawbacks encountered with the prior art constructions.

It is another object of the present invention to provide a safety steering wheel arrangement which in case of collision, shortens the resulting free acceleration of the driver and at the same time minimizes, if not eliminates altogether, the danger of injury, especially of those parts of the body of the driver which are least protected in case of such an accident.

Another object of the present invention resides in the provision of a safety steering wheel arrangement which achieves the aforementioned advantages without impairing the observation of the instruments at the instrument panel of the vehicle.

A still further object of the present invention resides in the provision of a safety steering wheel for passenger motor vehicles in which considerably improved safety is assured to the driver while at the same time maintaining sufficient freedom of movement for the driver.

Still another object of the present invention resides in the provision of a safety steering wheel arrangement for motor vehicles which is so constructed and arranged as to absorb in highly effective manner, impact forces by absorbing the energy thereof while at the same time assuring great safety under normal driving conditions by reliably absorbing those bending moments that are normally applied to the steering wheel and parts thereof for purposes of steering the vehicle.

Figure 2:
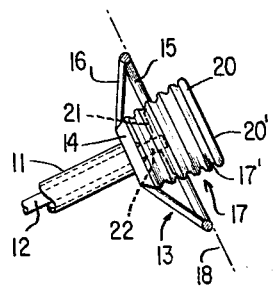
Figure 3:
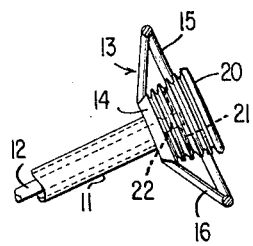
Figure 4:
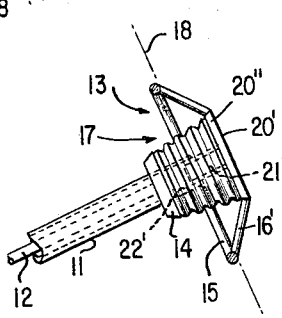

These and other objects, features and advantages of the present invention will become more obvious from the following description when taken in connection with the accompanying drawing, which shows, for purposes of illustration only, several embodiments in accordance with the present invention, and wherein FIGURE 1 is a side elevational view of safety steering wheel arrangement for a passenger motor vehicle in accordance with the present invention;

FIGURE 2 is a side elevational view of a modified embodiment of a safety steering wheel arrangement in accordance with the present invention under normal driving conditions;

FIGURE 3 is a side elevational view of the safety steering wheel arrangement of FIGURE 2, illustrating the same after an impact, and FIGURE 4 is a side elevational view of a still further modified embodiment of a safety steering wheel arrangement with a modified spoke support whereby the spokes of all four embodiments illustrated herein should be thought of in reality as swung or displaced by about 90° so as to normally extend substantially horizontally within the vehicle rather than vertically as shown in the drawing.

Referring now to the drawing wherein like reference numerals are used throughout the various views to designate corresponding parts, reference numeral 11 designates in all figures, the steering column and reference numeral 12 the steering spindle guided within the steering column 11. The steering wheel generally designated by reference numeral 13 is secured with the hub portion 14 thereof to the end of the steering spindle 12 facing the vehicle interior space. The spokes 16 connecting the steering wheel rim 15 with the hub portion 14 as well as a thin-walled, conically constructed and easily deformable hollow body generally designated by reference numeral 17 are supported on the hub portion 14 (FIGURES 1 to 3). The hollow body 17 extends with the part 17' thereof beyond the plane 18 of the steering wheel 13. The outer body wall surfaces of the hollow body 17 illustrated in FIGURE 1 have a smooth form whereas the outer body surfaces of the hollow body 17 illustrated in FIGURES 2 to 4 are undulated. The hollow body 17 (FIGURES 1 to 3) is provided on the side thereof facing the driver with a padded impact plate 20. The axial length of the hollow body 17, that is, the distance $a'$ between the steering wheel hub portion 14 and the impact surface 20' of the plate 20 in the not yet deformed condition of the hollow body 17, corresponds approximately to the distance $a$ between the impact surface 20' and the upper body 19 of the driver. The distance $a$ in the arrangement according to the present invention is considerably smaller as compared to the distance $b$ provided in the steering wheel arrangements used heretofore so that a considerably smaller kinetic energy of the body impinging against the impact plate 20 has to be absorbed by the deformable hollow body 17. The conical construction of the hollow body 17 is so dimensioned that the angle of vision $\alpha$ still includes the instruments of the instrument panel 23 through the steering wheel rim. Notwithstanding an impact plate 20 which is enlarged with respect to the hub portion 14, the instruments and light signals may still be readily observed with the construction according to the present invention.

The steering wheel shifting means, the actuating levers for signals, the steering lock and the like are arranged in the usual manner in proximity to the hub portion 14 of which the distances from the driver have remained unchanged as compared to the conventional arrangements. Since the deformable hollow body 17 merely has to be placed over or mounted on the recessed steering wheel hub portion 14, the installation of the safety arrangement in accordance with the present invention may also take place after completion of the vehicle, for example, in existing vehicles. The spokes 16 extend in an appropriate manner horizontally during straight drives and are so constructed that they, in turn, are also capable of absorbing deforming work. Consequently, the face and the body below the chest of the driver find a lesser resistance than the shoulders which are able to withstand a higher impact force.

In order to avoid a deflection or bending-out of the hollow body 17 out of its longitudinal direction in case of impact of the driver against the impact plate 20, a guide means may be provided within the hollow body 17 which consists of a guide member 21 securely connected with the hollow body 17 and of a guide member 22 secured to the steering wheel hub portion 14 which is adapted to be displaced within the guide member 21 during an impact of the driver.

The steering wheel arrangement illustrated in FIGURE 4 differs from that of FIGURES 1 to 3 by supporting the spokes 16' of the steering wheel rim 15, not on a hub portion 14 secured with the steering spindle 12, but instead on the impact plate 20'' facing the driver which consists of a correspondingly rigid material and the outwardly disposed part of which is again padded. In case of an impact, the steering wheel rim 15 of this embodiment is also pressed forwardly. In order to achieve a rigid connection in the direction of rotation between the steering spindle 12 and the steering wheel rim 15, and in order to enable bracing of bending moments acting on the steering wheel rim 15 without having to dimension the energy-absorbing hollow body 17 excessively large, a guide means is provided within the hollow body 17 which consists of a sleeve-shaped guide body 22' which is rigidly connected with the steering spindle 12 and of a similar guide body 21' which is displaced within the first-mentioned guide body 22' during an impact of the vehicle driver against the impact plate 20'', appropriate complementary means being provided between members 21' and 22' to assure rotation in unison with one another.

While I have shown and described several embodiments in accordance with the present invention, it is understood that the same is not limited thereto, but is susceptible of numerous changes and modifications within the spirit and scope thereof, as known to a person skilled in the art, and I therefore do not wish to be limited to the details shown and described herein, but intend to cover all such changes and modifications as are encompassed by the scope of the appended claim.

I claim:

A steering wheel arrangement for motor vehicles having a longitudinally extending steering spindle, comprising:
    a steering wheel rim having spoke means,
    means forming a hollow deformable body capable of absorbing energy, impact plate means closing the hollow body and forming an impact surface, and hub means supporting thereon said hollow body,
    said impact surface being disposed above said steering wheel rim,
    and said spoke means being supported on said plate means
    and guide means within said hollow body including two guide members having means providing for conjoint rotation and for sliding one within the other, one of said guide members being connected with said impact plate means and the other guide member being connected with said steering spindle.

References Cited by the Examiner

UNITED STATES PATENTS

| | | | |
|---|---|---|---|
| 1,647,903 | 10/1927 | Cook | 74—552 X |
| 3,016,764 | 1/1962 | Fredericks et al. | 74—552 |
| 3,087,352 | 4/1963 | Daniel | 74—552 |

FOREIGN PATENTS

| | | |
|---|---|---|
| 897,507 | 5/1962 | Great Britain. |

MILTON KAUFMAN, *Examiner.*

BROUGHTON G. DURHAM, *Examiner.*